United States Patent [19]

Summers et al.

[11] Patent Number: 5,781,695

[45] Date of Patent: Jul. 14, 1998

[54] REMOTE CAR HEATING SYSTEM WITH HEATER REMOTE CONTROL SENSOR REMOVABLY ATTACHED TO THE REAR VIEW MIRROR

[76] Inventors: Robert W. Summers; Tami Summers, both of 402 Sunny Dr., Waynesboro, Pa. 17268

[21] Appl. No.: 806,253

[22] Filed: Feb. 21, 1997

[51] Int. Cl.[6] ............... F24H 3/04; B60H 1/22; B60S 1/54

[52] U.S. Cl. ............ 392/383; 219/202; 219/526; 248/693; 340/825.72; 392/365

[58] Field of Search ............... 219/202, 203, 219/526, 533, 387; 392/383, 382, 365–369; 454/121, 124, 127, 69; 248/693, 682, 346.11, 188.8, 188.1; 307/10.1; 340/825.06, 825.69, 825.72, 533; 237/12.3 R, 28

[56] References Cited

U.S. PATENT DOCUMENTS

| | | | |
|---|---|---|---|
| 3,331,940 | 7/1967 | Reid, Jr. | 219/203 |
| 3,692,975 | 9/1972 | Markus et al. | 219/202 |
| 4,874,921 | 10/1989 | Gerbig, Jr. | 219/202 |
| 4,901,961 | 2/1990 | Gish | 248/503 |
| 4,904,844 | 2/1990 | Chamberlin | 219/203 |
| 5,463,203 | 10/1995 | Moore | 219/202 |
| 5,573,685 | 11/1996 | Boncaldo | 219/202 |

FOREIGN PATENT DOCUMENTS

| | | |
|---|---|---|
| 457964 | 11/1991 | European Pat. Off. . |
| 468304 | 1/1992 | European Pat. Off. . |
| 618097 | 10/1994 | European Pat. Off. . |
| 2673579 | 9/1992 | France . |
| 3009369 | 9/1981 | Germany . |
| 2291699 | 1/1996 | United Kingdom . |

*Primary Examiner*—John A. Jeffery

[57] ABSTRACT

A Remote Car Heating System for heating an interior portion of a vehicle without starting the vehicle. The inventive device includes an electric heater, a pliable mat secured to the electric heater, a remote sensor electrically connected to the electric heater, and a remote control for transmitting a signal which the remote sensor detects. The remote sensor includes a clip for removably coupling the sensor to the rear view mirror of a vehicle.

7 Claims, 3 Drawing Sheets

FIG. 1
FIG. 2
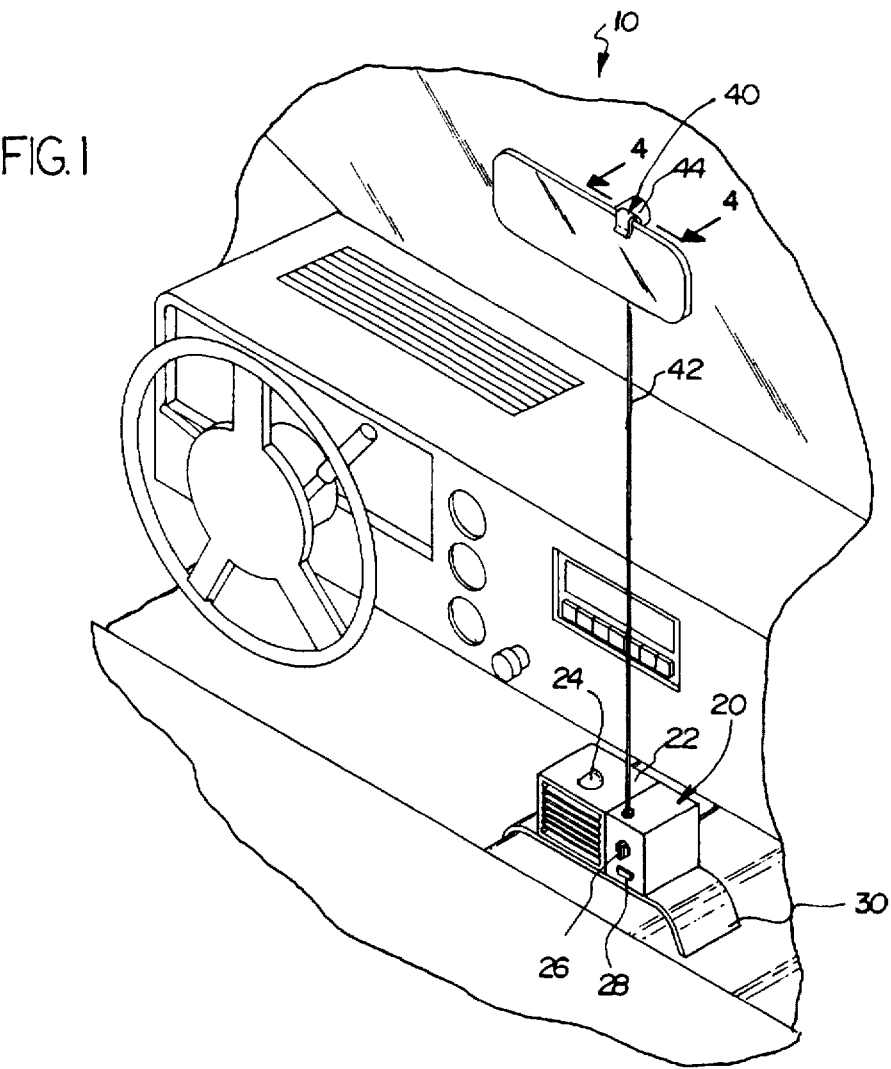
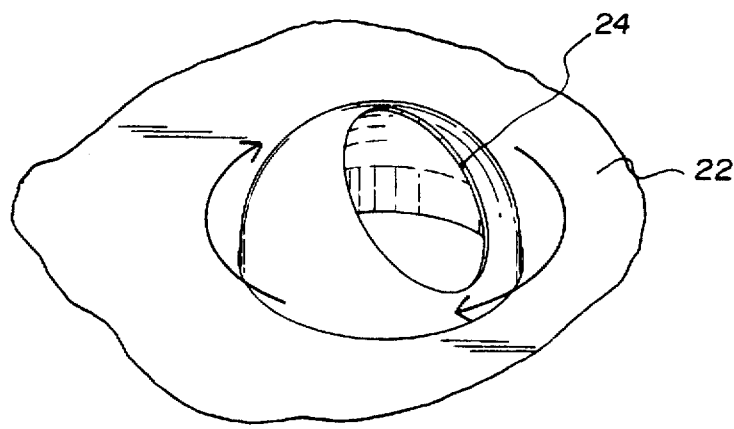

REMOTE CAR HEATING SYSTEM WITH HEATER REMOTE CONTROL SENSOR REMOVABLY ATTACHED TO THE REAR VIEW MIRROR

BACKGROUND OF THE INVENTION

1. Field of the Invention

The present invention relates to Vehicle Heating Devices and more particularly pertains to a remote car heating system for heating an interior portion of a vehicle without starting the vehicle.

2. Description of the Prior Art

The use of Vehicle Heating Devices is known in the prior art. More specifically, Vehicle Heating Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Vehicle Heating Devices include U.S. Pat. No. 4,965,432; U.S. Pat. No. 4,211,365; U.S. Design Pat. No. 358,873; U.S. Pat. No. 5,312,037; U.S. Pat. No. 4,633,061 and U.S. Design Pat. No. 347,683.

While these devices fulfill their respective, particular objectives and requirements, the aforementioned patents do not disclose a remote car heating system. The inventive device includes an electric heater, a pliable mat secured to the electric heater, a remote sensor electrically connected to the electric heater, and a remote control for transmitting a signal which the remote sensor detects.

In these respects, the remote car heating system according to the present invention substantially departs from the conventional concepts and designs of the prior art, and in so doing provides an apparatus primarily developed for the purpose of heating an interior portion of a vehicle without starting the vehicle.

SUMMARY OF THE INVENTION

In view of the foregoing disadvantages inherent in the known types of Vehicle Heating Devices now present in the prior art, the present invention provides a new Remote Car Heating System construction wherein the same can be utilized for heating an interior portion of a vehicle without starting the vehicle.

The general purpose of the present invention, which will be described subsequently in greater detail, is to provide a remote car heating system apparatus and method which has many of the advantages of the Vehicle Heating Devices mentioned heretofore and many novel features that result in a remote car heating system which is not anticipated, rendered obvious, suggested, or even implied by any of the prior art Vehicle Heating Devices, either alone or in any combination thereof To attain this, the present invention generally comprises an electric heater, a pliable mat secured to the electric heater, a remote sensor electrically connected to the electric heater, and a remote control for transmitting a signal which the remote sensor detects.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Remote Car Heating System apparatus and method which has many of the advantages of the Vehicle Heating Devices mentioned heretofore and many novel features that result in a new Remote Car Heating System which is not anticipated, rendered obvious, suggested, or even implied by any of the prior art Vehicle Heating Devices, either alone or in any combination thereof.

It is another object of the present invention to provide a new Remote Car Heating System which may be easily and efficiently manufactured and marketed.

It is a further object of the present invention to provide a new Remote Car Heating System which is of a durable and reliable construction.

An even further object of the present invention is to provide a new Remote Car Heating System which is susceptible of a low cost of manufacture with regard to both materials and labor, and which accordingly is then susceptible of low prices of sale to the consuming public, thereby making such remote car heating system economically available to the buying public.

Still yet another object of the present invention is to provide a remote car heating system which provides in the apparatuses and methods of the prior art some of the advantages thereof, while simultaneously overcoming some of the disadvantages normally associated therewith.

Still another object of the present invention is to provide a remote car heating system for heating an interior portion of a vehicle without starting the vehicle.

Yet another object of the present invention is to provide a remote car heating system which includes an electric heater, a pliable mat secured to the electric heater, a remote sensor electrically connected to the electric heater, and a remote control for transmitting a signal which the remote sensor detects.

Still yet another object of the present invention is to provide a remote car heating system that is activated either by a remote or by a timer.

Even still another object of the present invention is to provide a new remote car heating system that includes an automatic safety shut-off to prevent damage to the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein:

FIG. 1 is an upper perspective view of a remote car heating system according to the present invention.

FIG. 2 is an upper perspective view of the directional vent

DESCRIPTION OF THE PREFERRED EMBODIMENT

Figure 3:
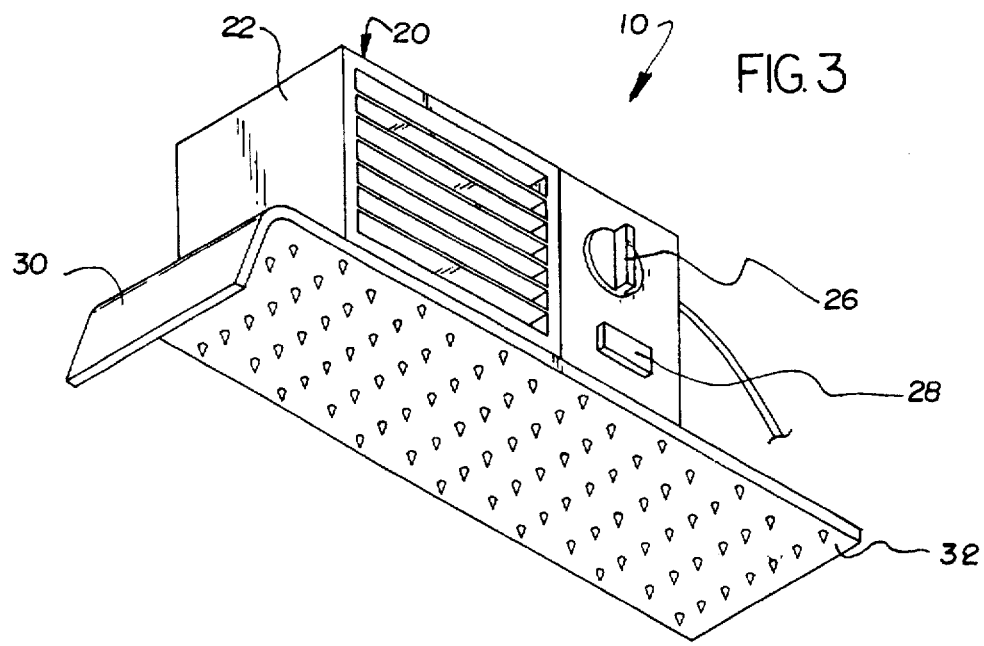
FIG. 3 is a lower perspective view of the present invention.

With reference now to the drawings, and in particular to FIGS. 1 through 6 thereof, a remote car heating system embodying the principles and concepts of the present invention and generally designated by the reference numeral 10 will be described.

More specifically, it will be noted that the remote car heating system 10 comprises an electric heater 20 powered by a portable power source or by a vehicle's electrical system, wherein the electric heater 20 is positionable within an interior portion of the vehicle. A remote sensor 40 is electrically connected to the electric heater 20 as shown in FIG. I of the drawings. The remote sensor 40 is electrically connected to the electric heater 20 by a length of wire 42 as shown in FIG. 1 of the drawings. A remote control 50 is provided, as shown in FIG. 5 of the drawings, for transmitting a signal which is detectable by the remote sensor 40 for activating the electric heater 20.

Figure 4:
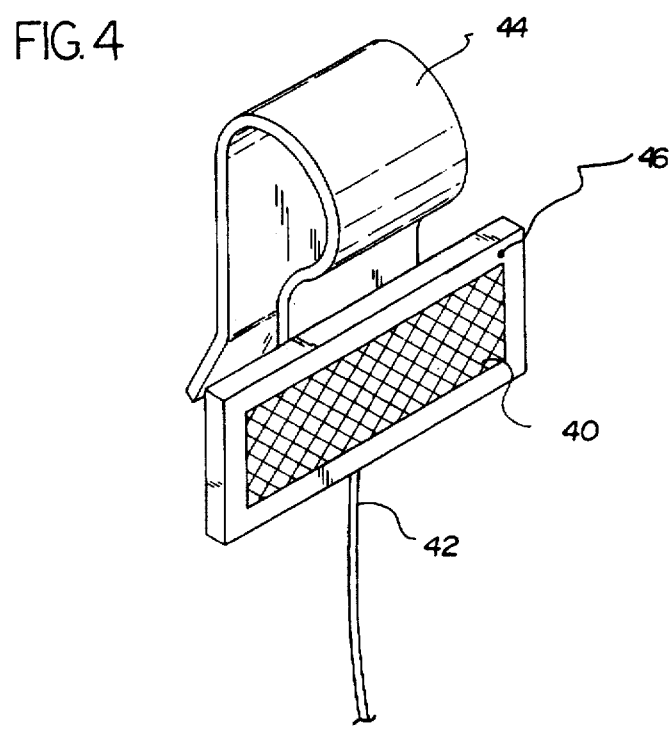
FIG. 4 is an upper perspective view of the remote sensor.

As shown in FIGS. 1 and 3, a pliable mat 30 is secured to a bottom surface of the electric heater 20. The pliable mat 30 has a plurality of spikes 32 as shown in FIG. 3. The pliable mat 30 is for contouring to and gripping a floor within the vehicle for retaining the position of the electric heater 20. The remote sensor 40 includes a clip 44 for removably coupling to a rearview mirror within the vehicle as shown in FIGS. 1 and 4. The remote sensor 40 preferably has an indicator light 46 electrically connected to the electric heater 20 for indicating to a user that the electric heater 20 is activated.

As shown in FIGS. 1 and 3 of the drawings, the electric heater 20 comprises an encasement 22 substantially rectangular shaped. A heating element is secured within the encasement 22. A blower is secured within the encasement 22 to blow air. A directional vent 24 is secured within the encasement 22 for receiving and directing heated air from the blower through the heating element to the interior portion of the vehicle. A power switch 28 is secured within the encasement 22 and is electrically connected in series mesial the blower and the heating element and the portable power source. The electric heater 20 preferably has a timer 26 secured within the encasement 22 and electrically connected mesial the portable power supply and the heating element and the blower for allowing the user to preset an amount of time when the electric heater 20 is activated.

Figure 5:
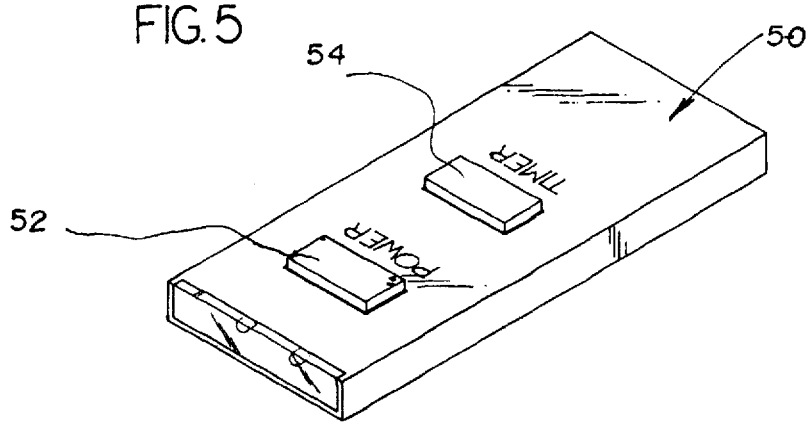
FIG. 5 is an upper perspective view of the remote control.
Figure 6:
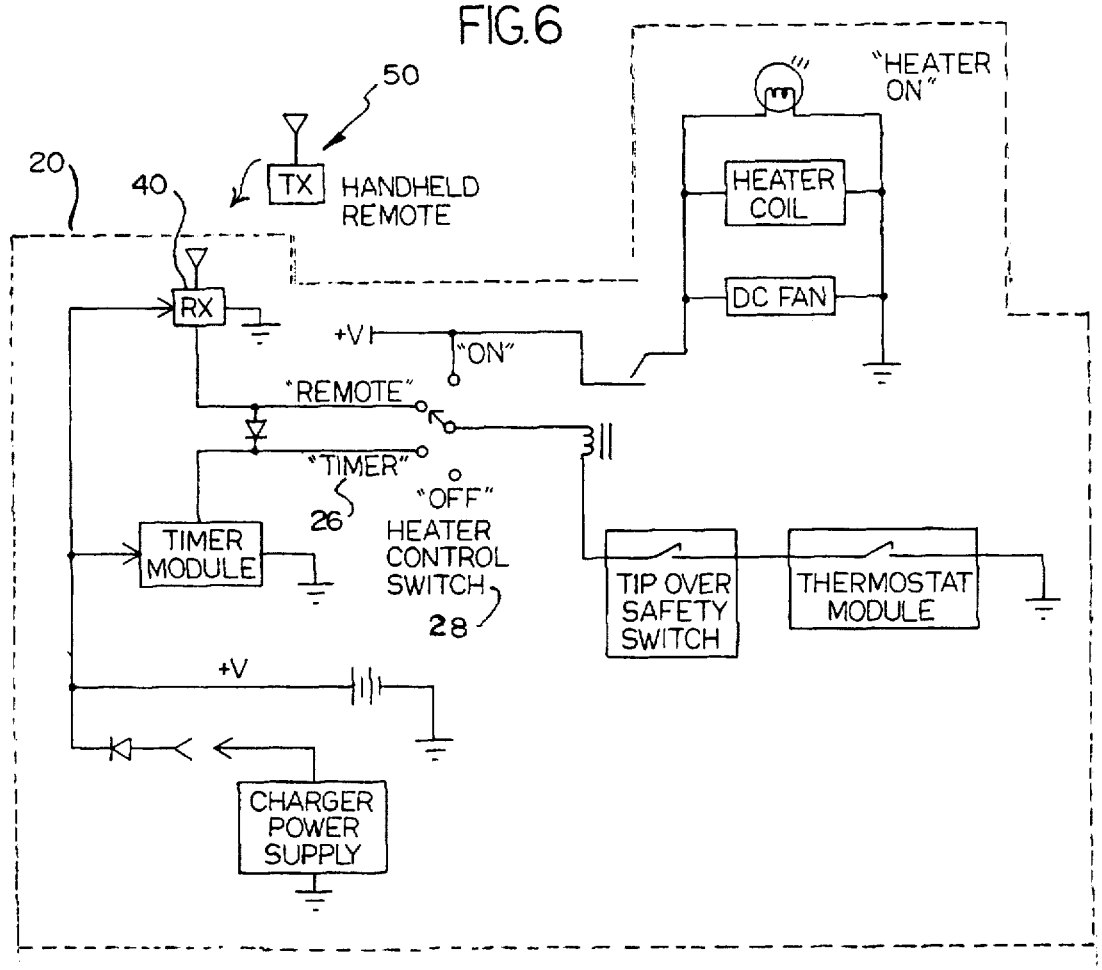
FIG. 6 is a schematic illustration of the present invention.

As shown in FIG. 5, the remote control 50 includes a power activator switch 52 for activating power to the electric heater 20. The remote control 50 further has a timer activator switch 54 for activating the timer 26 within the electric heater 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A remote car heating system comprising:

an electric heater powered by a portable power source or by a vehicle's electrical system, wherein said electric heater is positionable within an interior portion of a vehicle;

a remote sensor electrically connected to said electric heater;

a remote control for transmitting a signal which is detectable by said remote sensor for activating said electric heater;

a pliable mat secured to a bottom surface of said electric heater and wherein said pliable mat includes a plurality of spikes, for contouring to and gripping a floor within a vehicle for retaining the position of said electric heater; and wherein said remote sensor includes a clip for removably coupling said remote sensor to a rearview mirror within a vehicle.

2. The remote car heating system of claim 1, wherein said remote sensor includes an indicator light electrically connected to said electric heater for indicating to a user that said electric heater is activated.

3. The remote car heating system of claim 2, wherein said electric heater comprises:

an encasement substantially rectangular shaped;

a heating element within said encasement;

a blower within said encasement;

a directional vent secured within said encasement for receiving and directing heated air from said blower through said heating element to said interior portion of a vehicle; and a power switch secured within said encasement and electrically connected in series mesial said blower and said heating element and said portable power source.

4. The remote car heating system of claim 3, wherein said electric heater includes a timer secured within said encasement and electrically connected mesial said portable power supply and said heating element and said blower.

5. The remote car heating system of claim 4, wherein said remote control includes a power activator switch for activating power to said electric heater.

6. The remote car heating system of claim 5, wherein said remote control includes a timer activator switch for activating said timer within said electric heater.

7. The remote car heating system of claim 6, wherein said remote sensor is electrically connected to said electric heater by a length of wire.

* * * * *